United States Patent
Jin et al.

(10) Patent No.: US 11,371,340 B2
(45) Date of Patent: Jun. 28, 2022

(54) DETERMINATION OF BOREHOLE SHAPE USING STANDOFF MEASUREMENTS

(71) Applicant: Halliburton Energy Services, Inc., Houston, TX (US)

(72) Inventors: Jing Jin, Singapore (SG); Glenn Andrew Wilson, Houston, TX (US); Wei Li, Singapore (SG); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 467 days.

(21) Appl. No.: 16/495,501

(22) PCT Filed: Dec. 7, 2018

(86) PCT No.: PCT/US2018/064542
§ 371 (c)(1),
(2) Date: Sep. 19, 2019

(87) PCT Pub. No.: WO2020/117271
PCT Pub. Date: Jun. 11, 2020

(65) Prior Publication Data
US 2021/0108506 A1    Apr. 15, 2021

(51) Int. Cl.
*E21B 47/08*    (2012.01)
*G01B 17/06*    (2006.01)

(52) U.S. Cl.
CPC .............. *E21B 47/08* (2013.01); *G01B 17/06* (2013.01)

(58) Field of Classification Search
CPC ................................ E21B 47/08; G01B 17/06

USPC .......................................................... 33/544
See application file for complete search history.

(56) References Cited

U.S. PATENT DOCUMENTS

| | | | |
|---|---|---|---|
| 6,038,513 | A | 3/2000 | Varsamis et al. |
| 6,065,219 | A | 5/2000 | Murphey et al. |
| 7,966,874 | B2 | 6/2011 | Hassan et al. |
| 8,600,115 | B2 | 12/2013 | Liu |

(Continued)

FOREIGN PATENT DOCUMENTS

GB    2415257 A    12/2005

OTHER PUBLICATIONS

PCT Application Serial No. PCT/US2018/064542, International Search Report, dated Aug. 27, 2019, 3 pages.

(Continued)

*Primary Examiner* — George B Bennett
(74) *Attorney, Agent, or Firm* — Delizio, Peacock, Lewin & Guerra

(57) ABSTRACT

A downhole tool is placed in a borehole of a subsurface formation. The downhole tool comprises a plurality of calipers arranged around a circumference of the downhole tool. A plurality of standoff measurements is received for different rotation angles of the downhole tool, wherein each standoff measurement is indicative of a distance between one of the plurality of calipers and a wall of the borehole. A plurality of apparent diameters of the borehole is determined for the different rotation angles of the downhole tool based on the plurality of standoff measurements and a radius of the downhole tool. A probability function is determined based on the plurality of apparent diameters and at least one of a semiminor axis, semimajor axis, and ellipticity of the borehole is identified based on the probability function.

20 Claims, 11 Drawing Sheets

(56) References Cited

U.S. PATENT DOCUMENTS

| | | | |
|---|---|---|---|
| 9,354,050 | B2 | 5/2016 | Moake |
| 10,352,155 | B2* | 7/2019 | Wilson .................... E21B 47/13 |
| 2006/0096105 | A1 | 5/2006 | Haugland |
| 2010/0067329 | A1* | 3/2010 | Edwards ............... E21B 47/003 |
| | | | 367/82 |
| 2012/0192640 | A1 | 8/2012 | Minh et al. |
| 2013/0030705 | A1 | 1/2013 | Pei et al. |
| 2017/0314385 | A1 | 11/2017 | Hori et al. |
| 2020/0116023 | A1* | 4/2020 | Chen .......................... E21B 1/00 |
| 2020/0116884 | A1* | 4/2020 | Weng ................. E21B 47/0025 |
| 2020/0378240 | A1* | 12/2020 | Fouda ...................... G01B 7/10 |
| 2021/0164344 | A1* | 6/2021 | Wilson .................... E21B 47/13 |
| 2021/0270125 | A1* | 9/2021 | Smith ...................... E21B 47/01 |
| 2021/0404320 | A1* | 12/2021 | Jin ........................... G01V 1/52 |

OTHER PUBLICATIONS

PCT Application Serial No. PCT/US2018/064542, International Written Opinion, dated Aug. 27, 2019, 4 pages.
Gaillot, et al., "Borehole Imaging Tools—Principles and Applications", Scientific Drilling, No. 5, retrieved on Jan. 8, 2017 from http://publications.iodp.org/sd/05/suppl/borehole_imaging_tools.pdf, Sep. 2007, 4 pages.
Ozkaya, "Fracture Length Estimation from Borehole Image Logs", Mathematical Geology, Aug. 2003, vol. 35, No. 6, 18 pages.

* cited by examiner

DETERMINATION OF BOREHOLE SHAPE USING STANDOFF MEASUREMENTS

TECHNICAL FIELD

The disclosure generally relates to the field of drilling, and more particularly, to determining shape of a borehole drilled in a subsurface formation using standoff measurements.

BACKGROUND

A borehole is drilled in a geological formation to facilitate production of hydrocarbons. The borehole shape is preferentially circular, but it can take various shapes depending on a nature of the geological formation and drilling dynamics.

The shape of the borehole can be determined in many ways. A first method involves mechanical measurement by a tool with mechanical calipers arranged around a circumference of the tool. The tool is inserted into the borehole via a wireline which does not allow the tool to rotate. The mechanical calipers are spread out to physically touch a borehole wall of the borehole. The amount that each of the mechanical calipers are spread out at different rotational angles of the tool is indicative of the shape of the borehole. A second method involves a non-contact measurement. A logging while drilling (LWD) tool having an ultrasonic caliper is inserted into the borehole. The ultrasonic caliper transmits ultrasonic waves and receives reflections from the borehole wall at different rotational angles of the tool. The shape of the borehole can be determined based on a diameter of the tool and a travel time of the ultrasonic waves from the tool to a wall of the borehole and back to the tool.

The shape of the borehole is critical for well completions, such as planning cement volumes needed in a cementing operation. The shape of the borehole is also indicative of actual or predicted breakout or borehole stresses, e.g., failure of the rock in the borehole. In this regard, accurate determination of the shape of the borehole with low complexity facilitates efficient extraction of hydrocarbons.

BRIEF DESCRIPTION OF THE DRAWINGS

Embodiments of the disclosure may be better understood by referencing the accompanying drawings.

DESCRIPTION OF EMBODIMENTS

Figure 1:
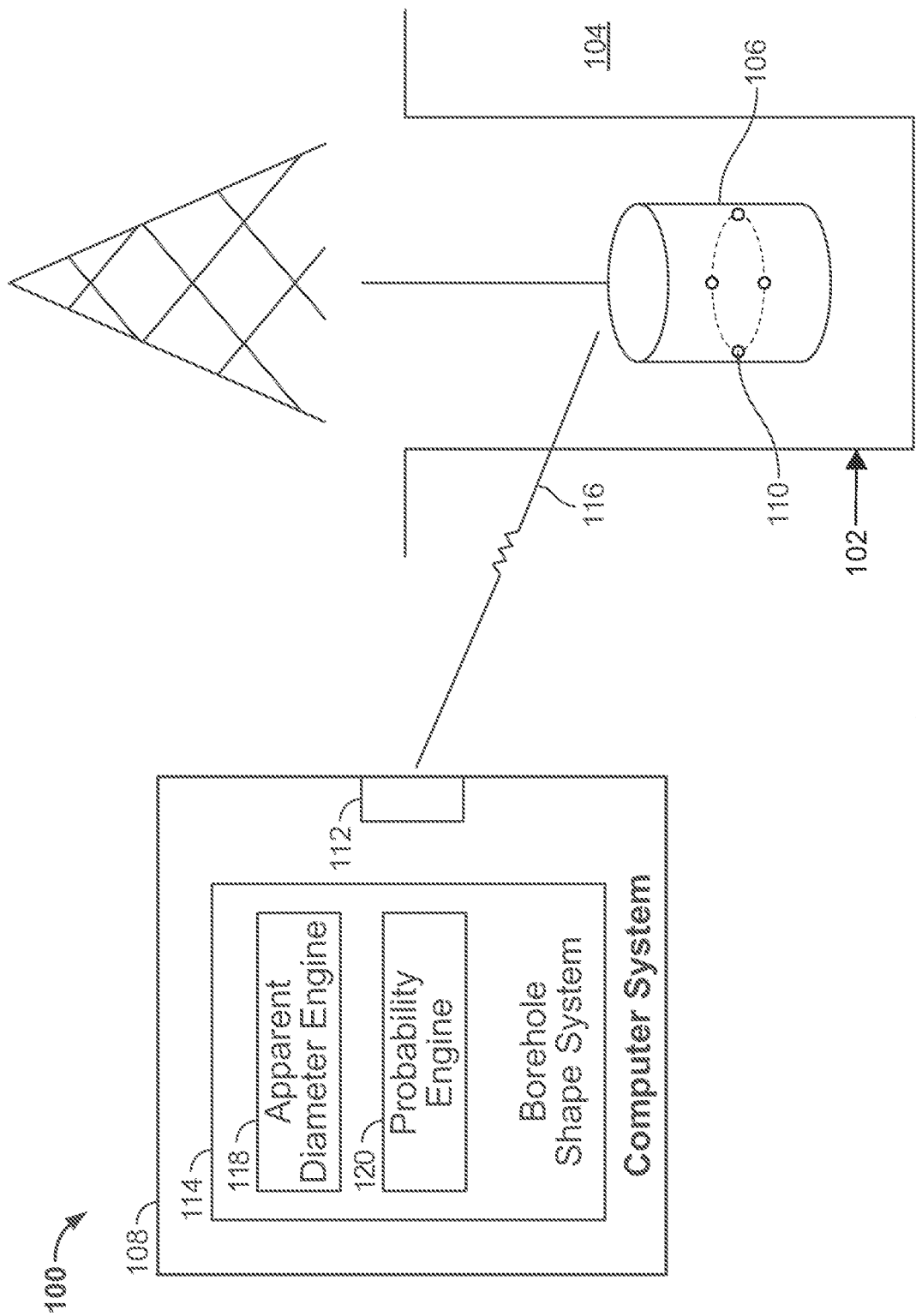
FIG. 1 illustrates a borehole shape system for determining a shape of a borehole in a formation.

The description that follows includes example systems, methods, techniques, and program flows that embody embodiments of the disclosure. However, it is understood that this disclosure may be practiced without these specific details. For instance, this disclosure refers to determining a shape of a borehole drilled in a formation in illustrative examples. Embodiments of this disclosure can be also applied to determining a shape of a hole in other contexts. Further, well-known instruction instances, protocols, structures and techniques have not been shown in detail in order not to obfuscate the description.

Overview

A tool used in non-contact determination of the shape of the borehole typically has two ultrasonic calipers located diagonally across from each other. Each ultrasonic caliper is used to calculate a standoff. The standoff is a travel distance of ultrasonic waves from the caliper to a wall of the borehole and back. The shape of the borehole is typically characterized by an apparent diameter. The apparent diameter is a diameter of the borehole for a given angular position of the tool in the borehole. The apparent diameter is determined by summing the standoffs associated with these two ultrasonic calipers and a diameter of the tool for the given angular position.

The tool with ultrasonic calipers can be arranged to rotate within the borehole. In this regard, a plurality of apparent diameters of the borehole may be calculated for various angular positions of the tool. A curve fitting such as least squares (LS) fitting is used to fit the apparent diameters at the various angular positions to a circle or ellipse to estimate a shape of the borehole.

LS fitting requires a complex multi-variate optimization process to determine the shape of the borehole. Further, the tool needs to be uniformly rotated in the borehole in order to collect needed measurements to perform the LS fitting. Still further, a borehole direction needs to be the same in a certain depth interval in order accurately determine the shape of the borehole.

Embodiments described herein are directed to determining a shape of a borehole based on a probability function. The probability function is indicative of a semimajor and semiminor axis of an ellipse representative of the shape of the borehole. The determination of a probability function to determine shape of the borehole has a lower complexity than determining shape based on the LS fitting.

In one or more examples, the probability function is a probability density function which specifies a probability of an apparent diameter taking a certain value. A tool is inserted into a borehole to determine a plurality of apparent diameters. The plurality of apparent diameter is analyzed to form a probability density function, referred to as an experimental probability density function. The experimental probability density function indicates a semimajor and semiminor axes of the borehole. The semimajor axis of the borehole is a maximum apparent diameter in the experimental probability density function. The semiminor axis of the ellipse is an apparent diameter in the experimental probability density function with maximum probability.

In other examples, the probability function is a cumulative density function which specifies a probability of an apparent diameter of the plurality of apparent diameters taking a certain value or less. The plurality of apparent diameters determined by a downhole tool inserted into a borehole of a formation are analyzed to form a cumulative density function, referred to as an experimental cumulative density function. A curve fitting such as a nonlinear least squares inversion is used to best fit a modeled cumulative density function to the experimental cumulative density function. Parameters of the modeled cumulative density function which achieve the best fit indicate the semimajor and semiminor axis of the borehole.

The description that follows includes example systems, apparatuses, and methods that embody aspects of the disclosure. However, it is understood that this disclosure may be practiced without these specific details. In other instances, well-known instruction instances, structures and techniques have not been shown in detail in order not to obfuscate the description.

Example Illustrations

FIG. 1 illustrates a well site system 100 in which various embodiments can be employed. The system 100 can be onshore or offshore. In this example system, a borehole 102 is formed in a geological formation 104 by rotary drilling in a manner that is well known. The system 100 includes a downhole tool 106 and a computer system 108.

The downhole tool 106 may be a structure positioned within the borehole 102. In one or more examples, the structure may be cylindrical in shape. The downhole tool 106 may be mounted on a drill string behind a drill bit in the formation 104 or to a wireline (or other conveyance) which is inserted into the borehole 102. The downhole tool 106 may be sized and configured to rotate and/or move in the borehole 102 as a result of the rotation of the drill bit or rotation of the wireline.

The downhole tool 106 may have one or more acoustic sensors in the form of conventional ultrasonic calipers 110 arranged around a circumference of the downhole tool 106. The ultrasonic calipers (transducers) 110 may transmit a high frequency signal such as a pulse and collect echoes of the high frequency signal reflected off a wall of the borehole 102. The ultrasonic calipers 110 may transmit and receive ultrasonic signals but the signals could take other forms including transmitting and receiving signals at frequencies other than ultrasonic frequencies. The downhole tool 106 is shown to have four ultrasonic calipers 110 separated by 90 degrees. The downhole tool 106 may have more or less ultrasonic calipers 110, but in one or more embodiments, the downhole tool 106 may have no less than two ultrasonic calipers 110. Additionally, the ultrasonic calipers 110 may be evenly spaced around the downhole tool 106 such that the ultrasonic calipers 110 are arranged to be diagonally across from each other on the downhole tool 106.

Computer system 108 may facilitate determination of a shape of the borehole 102. The shape may be a cross sectional representation of the borehole 102. The computer system 108 may be located on a surface of the formation 104 (as shown) or downhole in which case the computer system 108 may be rugged to withstand temperatures and pressures downhole. The computer system 108 may have a communication interface 112 which facilitates wired or wireless communication between the computer system 108 and the downhole tool 106 via a communication path 116. The computer system 108 may also have a borehole shape system 114 to facilitate the determination of the shape of the borehole 102.

A time of flight may be calculated between when an ultrasonic signal is transmitted and when it is received by a respective ultrasonic caliper 110. This time of flight is indicative of a standoff of the downhole tool 106 for a given rotational angle of the tool 106. Each ultrasonic caliper may send and receive signals at different frequencies, at different rotational angles of the downhole tool 106, and/or at different time intervals so that different measures of standoff can be performed in parallel. The borehole shape system 114 may have an apparent diameter engine 118 and probability engine 120 to process the standoffs to determine a shape of the borehole 102. The apparent diameter engine 118 may determine a plurality of apparent diameters of the borehole based on the standoffs. The apparent diameter may describe a diameter of the borehole at a given rotational angle of the downhole tool 106 in the borehole. The borehole shape system 114 may determine a plurality of apparent diameters for the borehole 102 for various rotational angles of the downhole tool 106. The probability engine 120 may determine from the apparent diameters a probability function indicative of the shape of the borehole as described in further detail below.

Figure 2:
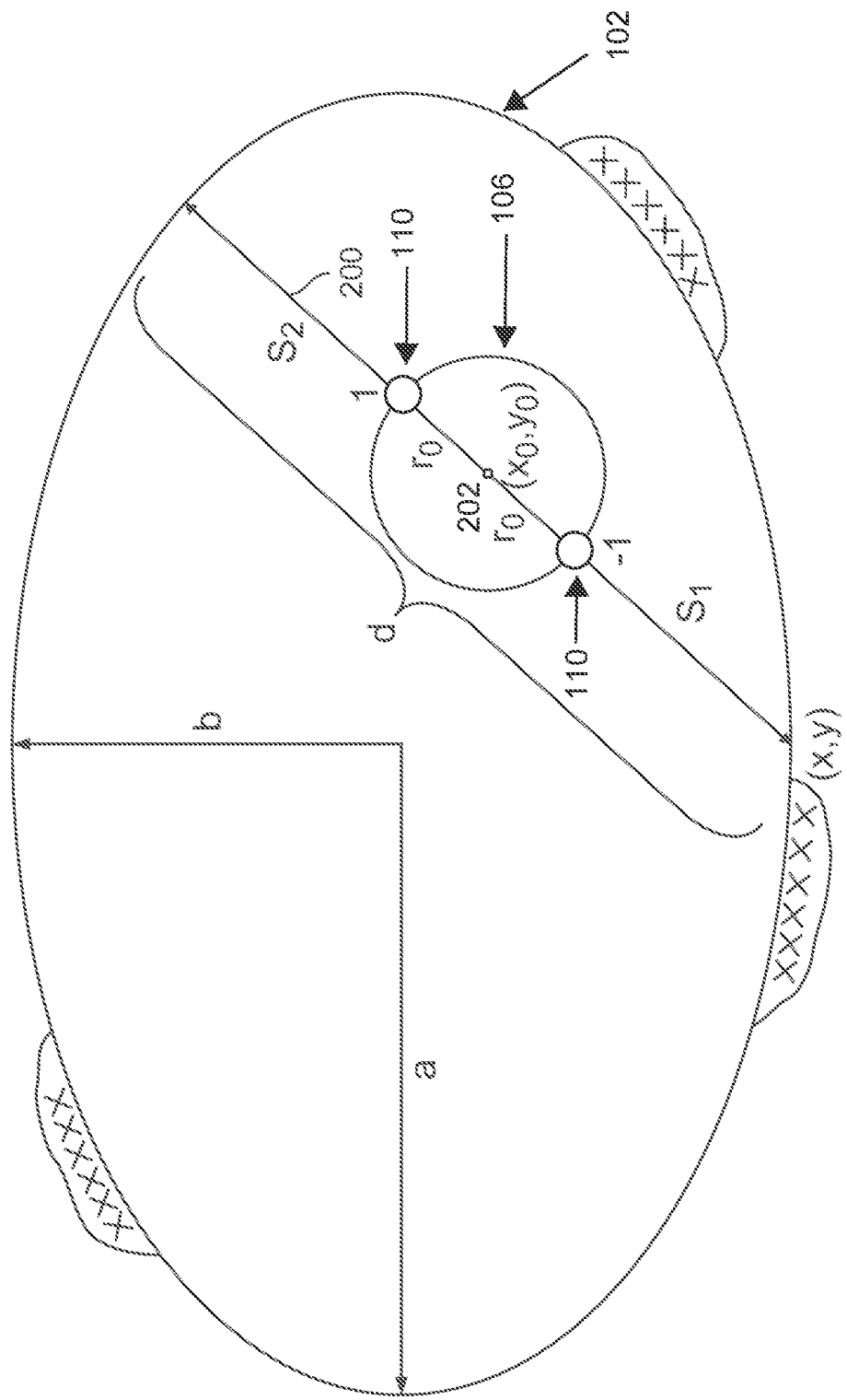
FIG. 2 illustrates example measurements associated with determining the shape of the borehole.

FIG. 2. illustrates example measurements associated with determining a shape, e.g., cross section, of a borehole 102, by the borehole shape system. The borehole shape system may identify the shape of the borehole 102 in terms of one or more of a semimajor axis a, semiminor axis b, and ellipticity. In this regard, the borehole shape system assumes the shape of the borehole 102 is a borehole ellipse and outputs a size of the borehole 102.

A downhole tool 106 may be positioned somewhere within the borehole 102. The downhole tool 106 may perform measurements in the borehole 102. The downhole tool 106 may vary in position in the borehole 102 as the borehole is drilled, but constrained to remain within walls of the borehole 102. The downhole tool 106 is shown in the borehole ellipse as eccentric from a centroid of the ellipse. A center 202 of the downhole tool 106 may be designated as $(x_0, y_0)$. The downhole tool 106 may also have at least two ultrasonic calipers 110 located at $(1, -1)$. In one or more examples, pairs of the ultrasonic calipers 110 may be directly across from each other on a body of the downhole tool 106.

The apparent diameter d determined by the apparent diameter engine may be based on a standoff $(S_1, S_2)$ of each ultrasonic caliper and a radius $r_0$ of the downhole tool 106. The standoff is a distance from the ultrasonic caliper to a wall of the borehole 102. The standoff is computed based on the indication of a travel time between when an ultrasonic signal is sent out, bounces off a wall of the borehole 102, and is received by the ultrasonic caliper 110. The standoff is calculated as:

$$standoff = V_{borehole} \cdot (t_{twoway})/2$$

where $V_{borehole}$ is sound velocity in the borehole 102 and $t_{twoway}$ is the travel time. The sound velocity in the borehole 102 may be based on materials in the borehole 102 which has a given sound velocity. The materials downhole in the subsurface formation may take the form of mud and mud velocity can be obtained precisely in situ if a mud cell is installed with the downhole tool. The mud cell may have an ultrasonic caliper which sends an ultrasonic signal and receives the ultrasonic signals to a fixed target through the mud. Based on a distance of the fixed target and time to send and receive the ultrasonic signal, the sound velocity can be determined. Alternatively, $V_{borehole}$ can be calculated based on sending ultrasonic signals to a casing section and receiving ultrasonic signals that bounce off the casing section. The casing may have a known geometry. Based on the known geometry and time to send and receive the ultrasonic signal, the sound velocity can be determined. The apparent diameter may be then calculated as:

$$d = s1 + s2 + 2r_0 \quad (1)$$

The apparent diameter d for an angle of rotation θ of the tool is shown as solid line 200. The apparent diameter d may vary as the ultrasonic tool moves and rotates within the borehole. In this regard, a plurality of apparent diameters may be calculated for the borehole 102 for a plurality of rotational angles and positions of the downhole tool 106 in the borehole 102 and stored in memory by the apparent diameter engine.

Other mechanisms for determining the apparent diameter may also be used. For example, the downhole tool may have an imaging device for imaging the borehole. The image may be analyzed through image processing techniques to determine the apparent diameter of the borehole. The examples described herein are not limited by the mechanism used to determine the apparent diameter of the borehole.

The apparent diameter may be expressed as a line. The line may take the form of:

$$y = m(x - x_0) + y_0 \qquad (2)$$

where $(x_0, y_0)$ is the origin of the downhole tool 106, $(x,y)$ is a position along a wall of the borehole 102, θ is an angle of rotation of the downhole tool 106, and $m = \tan(\theta)$. The shape of the borehole 102 may be expressed as an ellipse by the following equation:

$$\frac{x^2}{a^2} + \frac{y^2}{b^2} = 1 \qquad (3)$$

The apparent diameter may be calculated as:

$$d(x_0, y_0, \theta) = \frac{\sqrt{B^2 - 4AC}}{A} \cdot \sqrt{1 + \tan^2\theta} \qquad (4)$$

$$\begin{cases} A = \frac{b^2}{a^2} + \tan^2\theta \\ B = 2\tan\theta(y_0 - x_0\tan\theta) \\ C = (y_0 - x_0\tan\theta)^2 - b^2 \end{cases} \qquad (5)$$

The equation for apparent diameter has five unknowns which requires at least five measurements of apparent diameter to solve for the unknowns, including the semimajor and semiminor axes. Solving for the five unknowns is a computationally complex multivariate problem. To simplify the determination of the unknowns, the probability engine may determine the semimajor axis a and semiminor axis b of the ellipse based on a probability function associated with the apparent diameters rather than explicitly solving for the semimajor axis a and semiminor axis b. Substantial processing time may be saved by determining the semimajor and semiminor axes in this manner.

In one or more embodiments, the probability function may take the form of a probability density function (PDF) p(d) for determining the semimajor and semiminor axes. The PDF may be derived from a cumulative distribution function (CDF) of probability P(d) of the apparent diameter d. The CDF may be represented as:

$$P(d) = \frac{1}{c} \int \int \int_{d(x_0,y_0,\theta)<d} dx_0 dy_0 d\theta \qquad (6)$$

where c is a normalization factor such that a maximum value of the CDF is one and $x_0$, $y_0$, and θ are independent variables with uniform distribution. The CDF may be integrated based on a constraint that a position of the downhole tool remains within the borehole 102. With the borehole 102 being an ellipse, this constraint is reflected in the integration as:

$$\begin{cases} \frac{x_0^2}{a^2} + \frac{y_0^2}{b^2} \le 1 & (7.1) \\ \min_{\frac{x^2}{a^2} + \frac{y^2}{b^2} = 1} (x - x_0)^2 + (y - y_0)^2 \ge r_0^2 & (7.2) \end{cases}$$

where equation 7.1 constrains a center $(x_0, y_0)$ of the tool 106 to be located within the borehole 102 and equation 7.2 constrains the radius $r_0$ of the tool 106 to be within the borehole 102.

The probability density function (PDF) p(d) can be written as:

$$p(d) = P'(d) \qquad (8)$$

Figure 3:
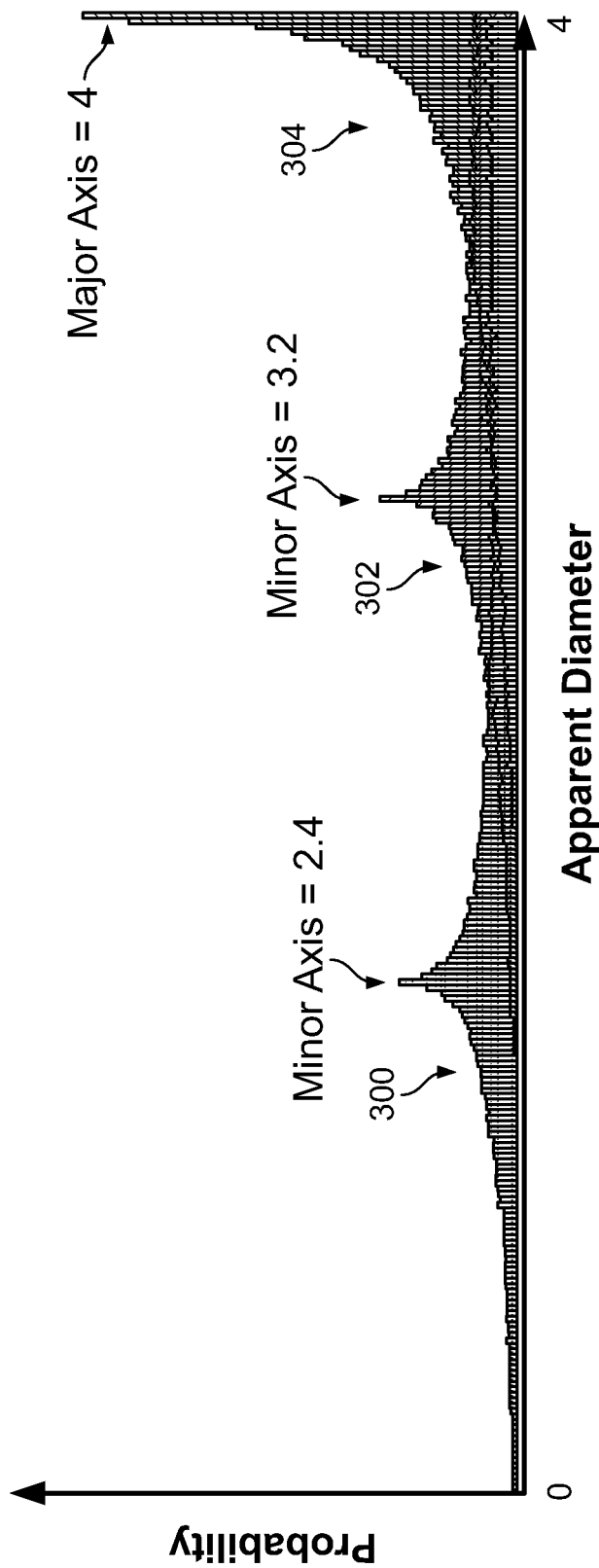
FIG. 3 shows an example of a simulated probability density function.

FIG. 3 shows example probability density functions as a result of simulating rotation of a downhole tool (e.g., 106 in FIGS. 1-2) in boreholes of different sizes based on a downhole tool with 16 transducers with a tool radius of 0.5. The probability density functions are calculated based on equations 6 to 8. First histogram 300 is based on e=0.6 (the length of minor axis is simulated as 2.4 and major axis is simulated as 4); second histogram 310 is based on e=0.8 (the length of minor axis is simulated as 3.2 and major axis is simulated as 4); and third histogram 310 is based on e=1.0 (the length of minor axis is simulated as 4 and major axis is simulated as 4).

Based on observations of FIG. 3, peaks of PDF p(d) coincide with the minor axis length in the respective cases and the major axis is the upper bound of d in the PDF p(d). Further, based on additional simulations (not shown here) such coincidence is independent of the tool size and the number of calipers. Hence, based on these observations, the semimajor a and semiminor axis b of a borehole can be determined as:

$$\begin{cases} a = \max\left(\frac{d}{2}\right) \\ b = \frac{\arg(\max(p(d)))}{2} \end{cases} \qquad (9)$$

where max( ) is a function that finds a maximum of variable provided to the function and arg( ) is a function that identifies an argument into the function that produces a value. To illustrate, max (d/2) finds the maximum apparent diameter of the probability density function which is indicative of the semimajor axis and arg ( ) identifies the apparent diameter which has the maximum probability of the probability density function which is indicative of the semiminor axis.

Figure 4:
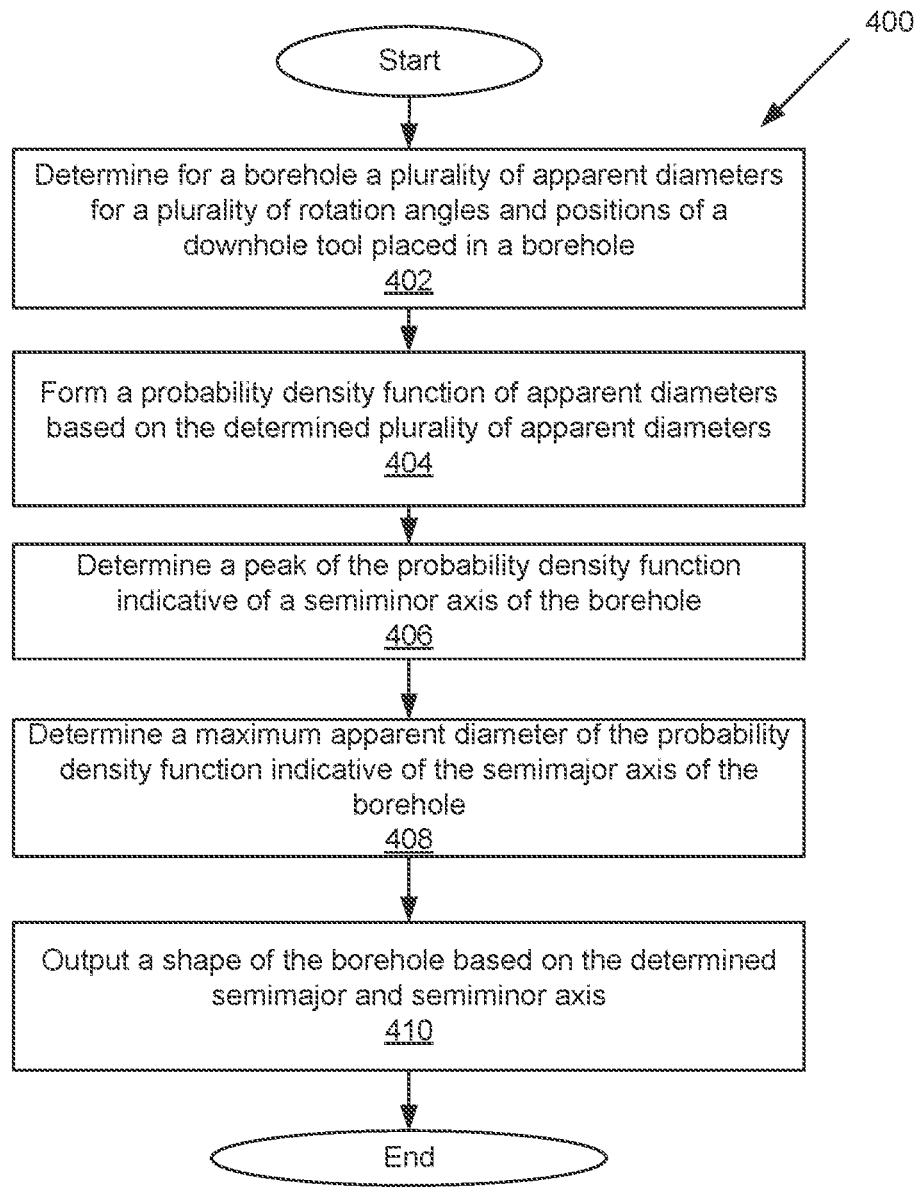
FIG. 4 is a flow chart of functions associated with determining the shape of the borehole based on a probability density function.

FIG. 4 is a flow chart of functions associated with determining the shape of the borehole in a geological formation based the observed relationship between a probability density function of the apparent diameters and the semiminor and semimajor axes of the borehole.

At 402, a plurality of apparent diameters for a borehole may be determined for a plurality of rotation angles of a downhole tool placed in a borehole. For example, a downhole tool (e.g., 106 in FIGS. 1-2) may rotate in the borehole, the ultrasonic calipers may transmit and receive ultrasonic signals, and standoffs may be calculated which are combined with a radius of the downhole tool to determine the apparent diameters. At 404, a probability density function of the apparent diameters is formed based on the determined apparent diameters. This probability density function may be referred to as an experimental probability density function.

Figure 5:
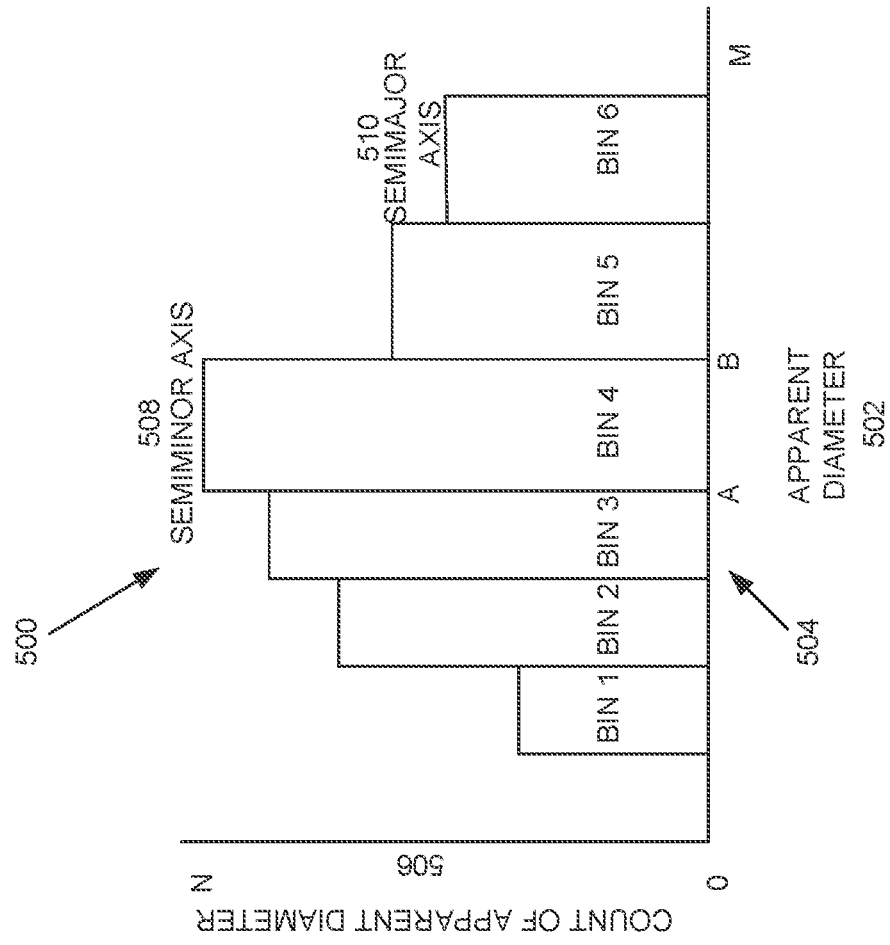
FIG. 5 shows an example of an experimental probability density function.

FIG. 5 is an example of the experimental probability density function 500. The experimental probability density function 500 may have an axis 502 which represents a range of apparent diameters. The axis 502 may be subdivided into non-overlapping subranges where each subrange is a bin 504. An axis 506 may indicate how many apparent diameters of the determined plurality of apparent diameters falls within a subrange of the apparent diameters. For example, a counter associated with a bin may be incremented by one each time an apparent diameter falls in the subrange of apparent diameters associated with the bin. This process is repeated for the plurality of apparent diameters determined at 402. In one or more examples, counts associated with each bin may then be normalized across all bins to define the probability density function 500 of the apparent diameters.

At 406, an apparent diameter associated with the peak of the probability density function (shown in FIG. 5 as 508) may be determined which is indicative of the semiminor axis of the borehole. At 408, the maximum apparent diameter of the probability density function with non-zero probability (shown in FIG. 5 as 510) may be determined which is indicative of the semimajor axis of the borehole. At 410, a shape of the borehole may be output in terms of the determined semimajor and semiminor axis.

The computation of p(d) relies on collecting a large number of apparent diameters for a plurality of rotation angles and positions of the downhole tool in the borehole. Additionally, the computation of p(d) depends on a choice of bin sizes for binning the apparent diameters. Choosing a bin size with a smaller or larger subrange of apparent diameters affect a shape and peak of the probability density function and the shape of the borehole ellipse that is determined.

In one or more embodiments, a CDF represented as P(d) may be itself used to determine the shape of the borehole ellipse which unlike the probability density function p(d) is not impacted by a bin size. The CDF may indicate a probability that an apparent diameter of a borehole is less than or equal to a given value. In some cases, a solution of the integral in Eq. 6 above may be represented a function $f(d|e, r_0)$, where we define $$e = \frac{b}{a}$$

as ellipticity and $f$ is dependent on e and $r_0$ to reduce a number of variables from three to two in the CDF. In some cases, a range of variable d and parameter $r_0$ may also be normalized so that d ranges from [0, 2] and $r_0$ ranges from (0,1] for $f(d|e,r_0)$. Therefore, the relation between P(d) and $f(d|e, r_0)$ can be written as:

$$P_{a,b,r_0}(d) = f\left(\frac{d}{a}\bigg|e, \frac{r_0}{a}\right) \quad (10)$$

Figure 6:
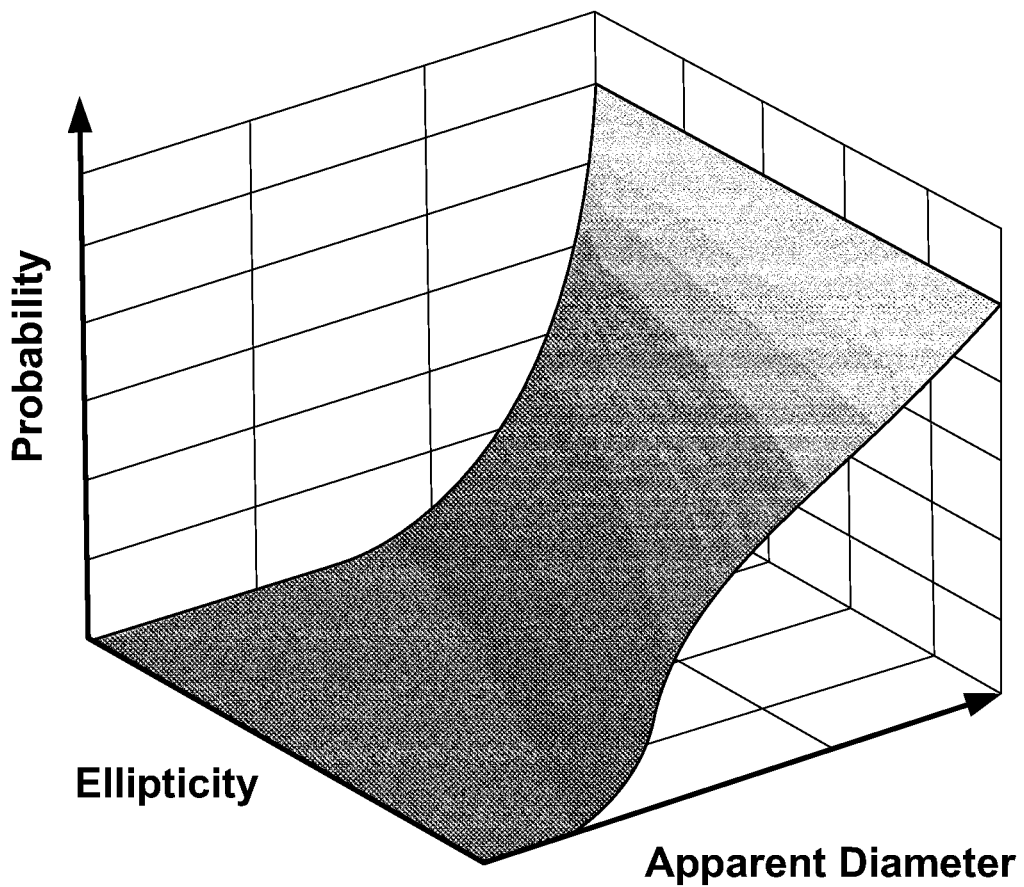
FIG. 6 shows an example of a modeled cumulative distribution function.

FIG. 6 shows an illustration of f(d|e, $r_0$) for fixed $r_0$ versus apparent diameter d and ellipticity e for tool radius $r_0$ 0.25 and a semimajor axis of 1. The function f(d|e, $r_0$) may be referred to as a modeled CDF. A shape of the modeled CDF may be based on one or more of the semimajor axis of a borehole, semiminor axis of a borehole, and ellipticity of a borehole.

The modeled CDF represented by equations 6 and 7 may be curve fit to an experimental CDF to determine the semimajor and semiminor axes of the borehole associated with the experimental CDF. The experimental CDF may be a CDF determined by inserting a downhole tool into a formation, determining a plurality of apparent diameters, and using the plurality of apparent diameters to calculate a CDF. A non-linear least squares inversion may be used to curve fit the experimental CDF to the modeled CDF. To facilitate the application of the non-linear least squares inversion, $$a' = \frac{1}{a}$$

may be defined for simplification, and the Jacobian J of $P_{a,b,r_0}(d)$ can be defined as follows:

$$\begin{cases} J_{a'j} = \frac{\partial}{\partial a'} P_{a,b,r_0}(d) \\ J_{ej} = \frac{\partial}{\partial e} P_{a,b,r_0}(d) \end{cases} \quad (11)$$

In one or more examples, the Jacobian may take the form of:

$$\begin{cases} J_{aj} = \frac{\partial}{\partial a'} P_{a,b,r_0}(d) = d\frac{\partial}{\partial d'} f(d'|e, a'r_0) + r_0 \frac{\partial}{\partial r'_0} f(a'd|e, r'_0) \\ J_{ej} = \frac{\partial}{\partial e} P_{a,b,r_0}(d) = \frac{\partial}{\partial e} f\left(\frac{d}{a}\bigg|e, \frac{r_0}{a}\right) \end{cases} \quad (12)$$

The Jacobians relate a change in the modeled CDF to a change in the parameters indicative of the shape of the borehole which in this case is the semimajor axis and the ellipticity since the modeled CDF is a function of these parameters. The standard iterative nonlinear least squares inversion becomes:

$$\begin{pmatrix} a'_l \\ e_l \end{pmatrix} = (J \cdot J^T)^{-1} J \Delta y_l \quad (13)$$

where $\Delta y_l = f_{exp}(d) - f(a_l' \cdot d|e_l, a_l' r_0)$. An is the misfit between the experimental CDF $f_{exp}$ (d) and the modelled CDF $f(a_l'd|e_l,a_l'r_0)$, where l denotes the number of iterations, i.e., $a_l'$ is l-th iterative value of a'. Optimal $(a_l' e_l)'$ is then iteratively solved, each iteration improving the estimate of the shape of the borehole until the misfit reaches a desired threshold level. In this regard, the standard iterative nonlinear least squares approach best fits the modeled CDF to the experimental CDF and the parameters of the modeled CDF, including a and e are indicative of the shape of the borehole.

A total number of measurements n by each caliper may be given by the following relation:

$$n_{min} \leq \frac{D \cdot R_f \cdot rpm \cdot N}{2 \cdot V_{DS}} \quad (14)$$

where $n_{min}$ is the minimal required total number of measurements, D is a spatial resolution (e.g., depth) over which the measurements is performed, $R_f$ is a firing rate of the caliper (measurements per revolution of the downhole tool), rpm is revolutions per minute that the downhole tool is spinning, N is a number of calipers on the downhole tool, and $V_{ds}$ is a drilling speed (e.g., ft/min). A minimal number of measurements $n_{min}$ may be a design parameter which is chosen so that a standard deviation of the experimental CDFs across different tool radius and ellipticity is within a desired range such as 0.1. Based on this minimal number of measurements $n_{min}$ a minimal caliper firing rate is determined by solving for $R_f$ in equation 13 to result in equation 14:

$$R_f \geq \frac{2 \cdot V_{DS} \cdot n_{min}}{D \cdot rpm \cdot N} \quad (15)$$

Figure 7:
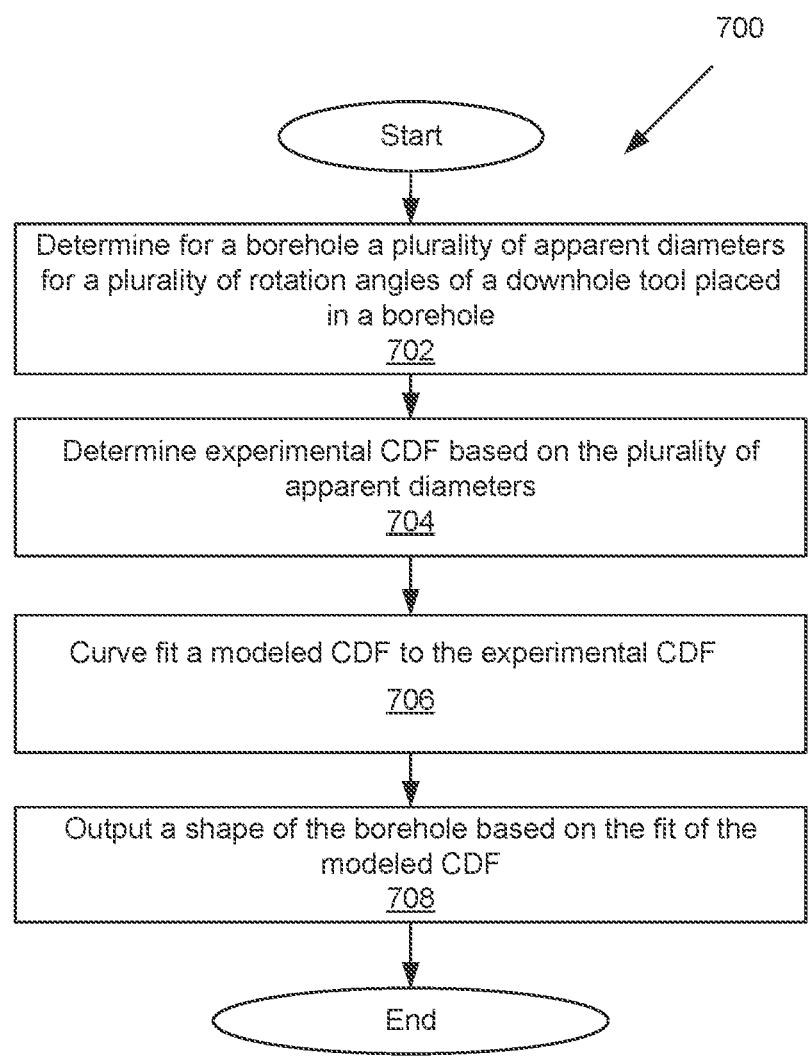
FIG. 7 is a flow chart of functions associated with determining the shape of the borehole based on the modeled cumulative distribution function.

FIG. 7 is another flow chart of functions associated with determining the shape of the borehole based a probability density function of the apparent diameters. At 702, a plurality of apparent diameters for a borehole may be determined for a plurality of rotation angles of a downhole tool (e.g., 106 in FIGS. 1-2) placed in a borehole. For example, the downhole tool may rotate in the borehole, the ultrasonic calipers may transmit and receive ultrasonic signals, and standoffs may be calculated which are combined with a radius of the downhole tool to determine the apparent diameter. At 704, an experimental CDF may be determined based on the apparent diameters.

Figure 8:
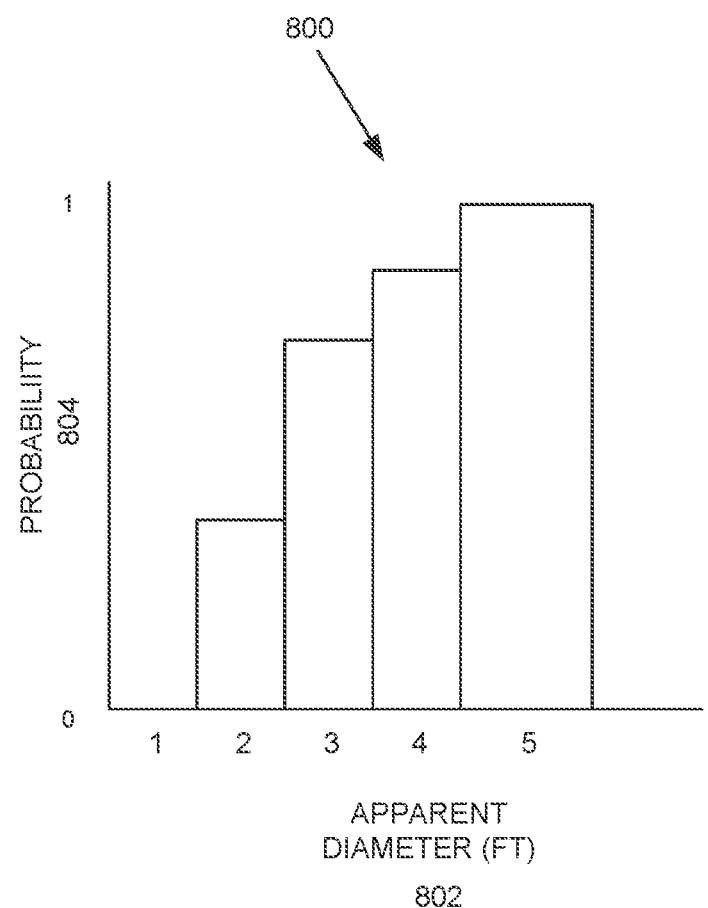
FIG. 8 shows an example of an experimental cumulative distribution function.

FIG. 8 is an example of this experimental CDF 800. The experimental CDF 800 may show on an axis 802 a range of apparent diameters and on an axis 804 a probability. The apparent diameters of axis 802 may span from 0 to 5 ft and the probability may span from 0 to 1. The experimental CDF 800 may indicate a probability that an apparent diameter of the borehole is less than or equal to a given size. To illustrate, an apparent diameter of 3 may be associated with a probability of 0.75 on the experimental CDF which means that the borehole may have an 0.75 probability that the apparent diameter of the borehole is less than or equal to 3 ft.

At 706, the modeled CDF may be curve fit to the experimental CDF. The modeled CDF may indicate a shape of a CDF of apparent diameters of a borehole as a function of parameters indicative of one or more of a semimajor axis, semiminor axis, and ellipticity of the borehole. The parameters of the modeled CDF may be iteratively adjusted and the modeled CDF compared to the experimental CDF until a difference is less than a threshold amount. The parameters of the modeled CDF with difference less than the threshold amount are indicative of one or more of a semimajor axis, semiminor axis, and ellipticity of the borehole. The curve fit may take a variety of forms including a nonlinear least squares inversion process. At 708, an indication of the semimajor and semiminor axis may be output based on the curve fit.

In the examples described above, the modeled CDF may be function of the semimajor axis and ellipticity. The modeled CDF may be a function of other indictors of the shape of the borehole including the semimajor or major axis and semiminor or minor axis. The equations are not generally limited to the inputs and outputs described above. For example, the curve fitting may indicate a shape of a borehole in terms other than the semimajor axis and ellipticity.

Further, in the examples described above, an apparent diameter is determined based off the standoff measurements which is used to calculate the shape of the borehole. A radius may be used instead of the apparent diameter to calculate the shape of the borehole with adjustments to account for the fact that the radius is one-half of the apparent diameter.

Figure 9:
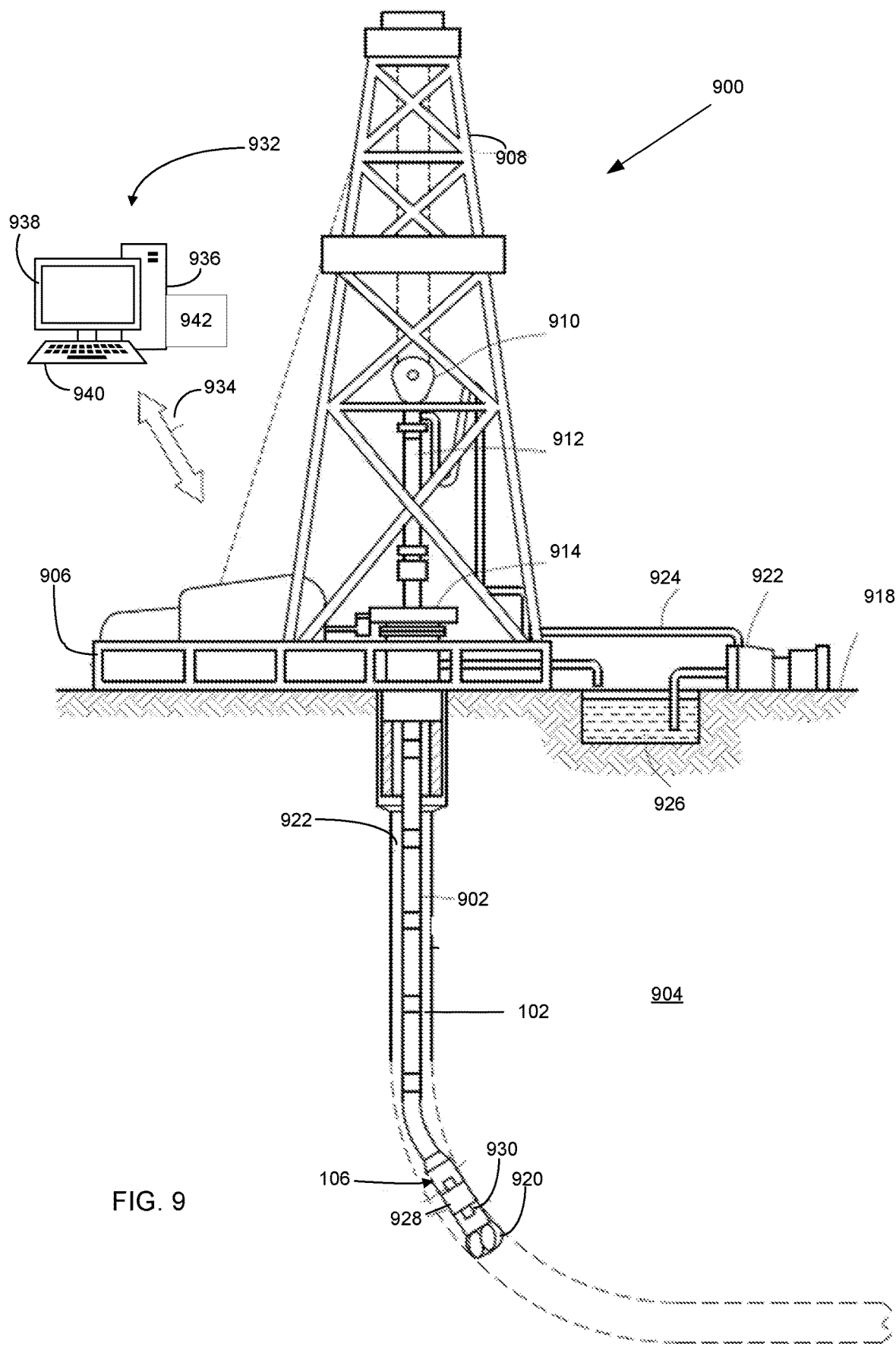
FIG. 9 is schematic diagram of well apparatus.

FIG. 9 is a schematic diagram of an apparatus 900 that can be used to perform some of the operations and functions described with reference to FIGS. 1-8. The apparatus 900 includes a downhole tool 106 disposed on a drill string 902 of a depicted well apparatus 900. While borehole 102 is shown extending generally vertically into the subterranean formation 904, the principles described herein are also applicable to boreholes that extend at an angle through the subterranean formation 904, such as horizontal and slanted boreholes. For example, although FIG. 9 shows a vertical or low inclination angle well, high inclination angle or horizontal placement of the well and equipment is also possible. It should further be noted that while FIG. 9 generally depicts a land-based operation, those skilled in the art will readily recognize that the principles described herein are equally applicable to subsea operations that employ floating or sea-based platforms and rigs, without departing from the scope of the disclosure.

The apparatus further includes a drilling platform 906 that supports a derrick 908 having a traveling block 910 for raising and lowering drill string 902. Drill string 902 may include, but is not limited to, drill pipe and coiled tubing, as generally known to those skilled in the art. A kelly 912 may support drill string 902 as it may be lowered through a rotary table 914. A drill bit 920 may be attached to the distal end of drill string 902 and may be driven either by a downhole motor and/or via rotation of drill string 902 from the surface 918. Without limitation, drill bit 920 may include, roller cone bits, PDC bits, natural diamond bits, any hole openers, reamers, coring bits, and the like. As drill bit 920 rotates, it may create and extend borehole 102 that penetrates various subterranean formations such as 904. A pump 922 may circulate drilling fluid through a feed pipe 924 to kelly 912, downhole through interior of drill string 902, through orifices in drill bit 920, back to surface 918 via annulus 922 surrounding drill string 902, and into a retention pit 926.

Drill bit 920 may be just one piece of a downhole assembly that may include one or more drill collars 928 and the downhole tool 106. One or more of drill collars 926 may form a tool body 928, which may be elongated as shown on FIG. 9. Downhole tool 106 may be any suitable material, including without limitation titanium, stainless steel, alloys, plastic, combinations thereof, and the like. Downhole tool 106 may further include one or more sensors 930.

The sensors 930 may include two or more acoustic calipers, e.g., ultrasonic calipers, to determine apparent diameter of the borehole 102. Any suitable technique may be used for transmitting signals, e.g., an indication of output by the downhole tool 106 to a computer system 932 residing on the surface 918. As illustrated, a communication link 934 (which may be wired or wireless, for example) may be provided that may transmit data from downhole tool 106 to the computer system 932 at the surface 918. Communication link 934 may implement one or more of various known drilling telemetry techniques such as mud-pulse, acoustic, electromagnetic, etc. Computer system 932 may include a processing unit 936, a monitor 938, an input device 940 (e.g., keyboard, mouse, etc.), and/or machine readable media 942 (e.g., optical disks, magnetic disks) that can store code representative of the methods described herein. Computer system 932 may act as a data acquisition system and possibly a data processing system that analyzes information from downhole tool 106. For example, computer system 932 may process the information from downhole tool 106 for determining a shape of the borehole based on the apparent diameters and probability functions as described herein. This processing may occur at the surface 918 in real-time. Alternatively, the processing may occur at surface 918 or another location after withdrawal of downhole tool 106 from borehole 102. Still alternatively, the processing may be performed downhole in the subterranean formation 904 by the downhole tool 106.

Figure 10:
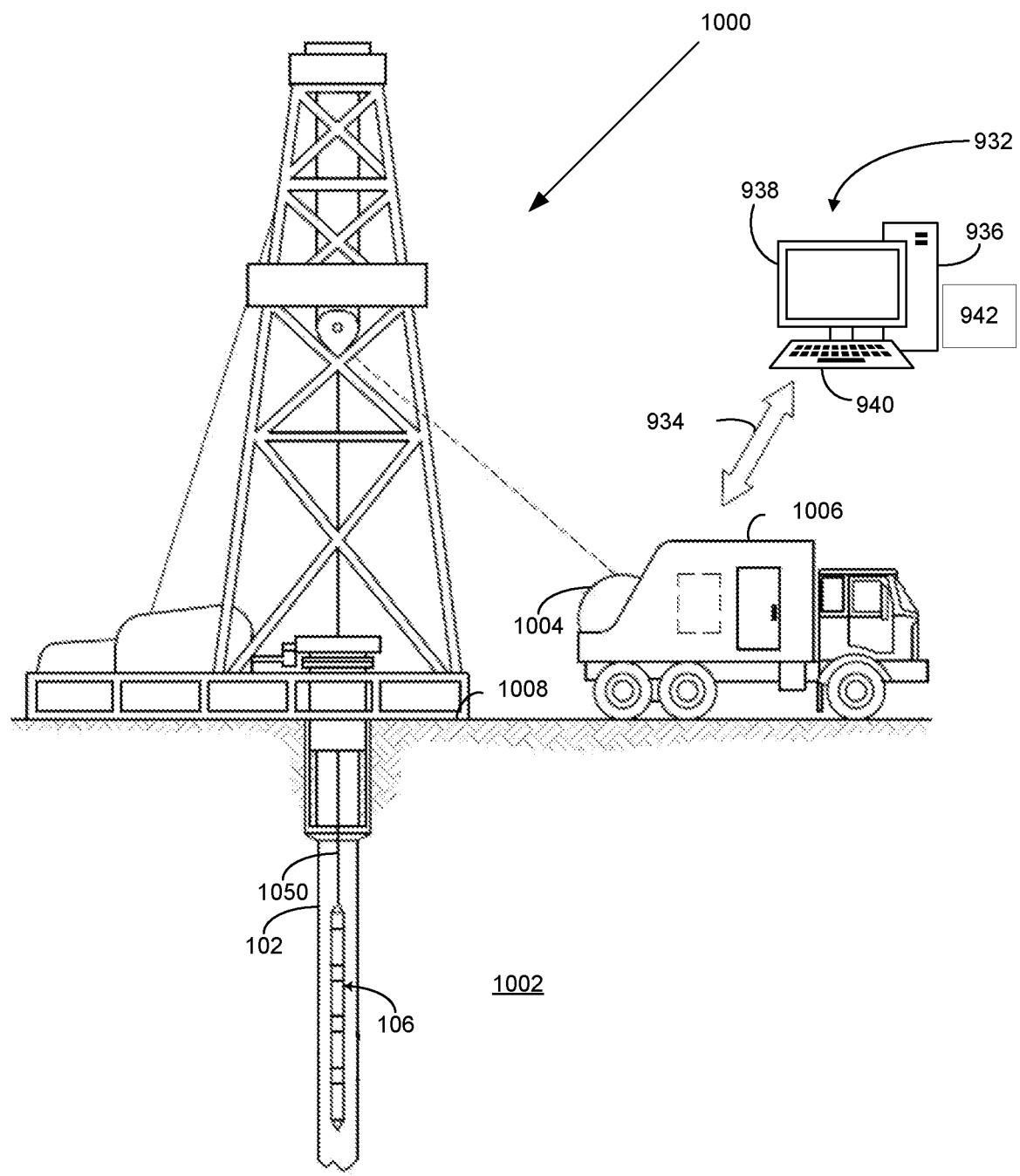
FIG. 10 is another schematic diagram of well apparatus.

Referring now to FIG. 10, a schematic diagram 1000 is shown of downhole tool 106 on a wireline 1050. As illustrated, a borehole 102 may extend through subterranean formation 1002. Downhole tool 106 may be similar in configuration and operation to downhole tool 106 shown on FIG. 9 except that FIG. 10 shows downhole tool 106 disposed on a conveyance, e.g., wireline 1050 as shown. It should be noted that while FIG. 10 generally depicts a land-based drilling system, those skilled in the art will readily recognize that the principles described herein are equally applicable to subsea drilling operations that employ floating or sea-based platforms and rigs, without departing from the scope of the disclosure.

As illustrated, a hoist 1004 may be used to run downhole tool 106 into borehole 102. Hoist 1004 may be disposed on a recovery vehicle 1006. Hoist 1004 may be used, for example, to raise and lower wireline 1050 in borehole 102. While hoist 1004 is shown on recovery vehicle 1006, it should be understood that wireline 1050 may alternatively be disposed from a hoist 1004 that is installed at the surface 1008 instead of being located on recovery vehicle 1006. Downhole tool 106 may be suspended in borehole 102 on wireline 1050. Other conveyance types may be used for conveying downhole tool 106 into borehole 102, including coiled tubing, wired drill pipe, slickline, and downhole tractor, for example. Downhole tool 106 may comprise a tool body, which may be elongated as shown on FIG. 10. Tool body may be any suitable material, including without limitation titanium, stainless steel, alloys, plastic, combinations thereof, and the like. Downhole tool 106 may further include ultrasonic calipers for measuring an apparent diameter of the borehole.

As previously described, information from downhole tool 106 may be transmitted to computer system 932, which may be located at surface 1008. As illustrated, communication link 934 (which may be wired or wireless, for example) may be provided that may transmit data, from downhole tool 106 to a computer system 932 at surface 1008. Computer system 932 may include a processing unit 936, a monitor 938, and an input device 940 (e.g., keyboard, mouse, etc.), and/or machine readable media 942 (e.g., optical disks, magnetic disks) that can store code representative of the methods described herein for determining a shape of the borehole based on the apparent diameters and probability functions as described herein. In addition to, or in place of processing at surface 1008, processing may occur downhole by the downhole tool 106.

Figure 11:
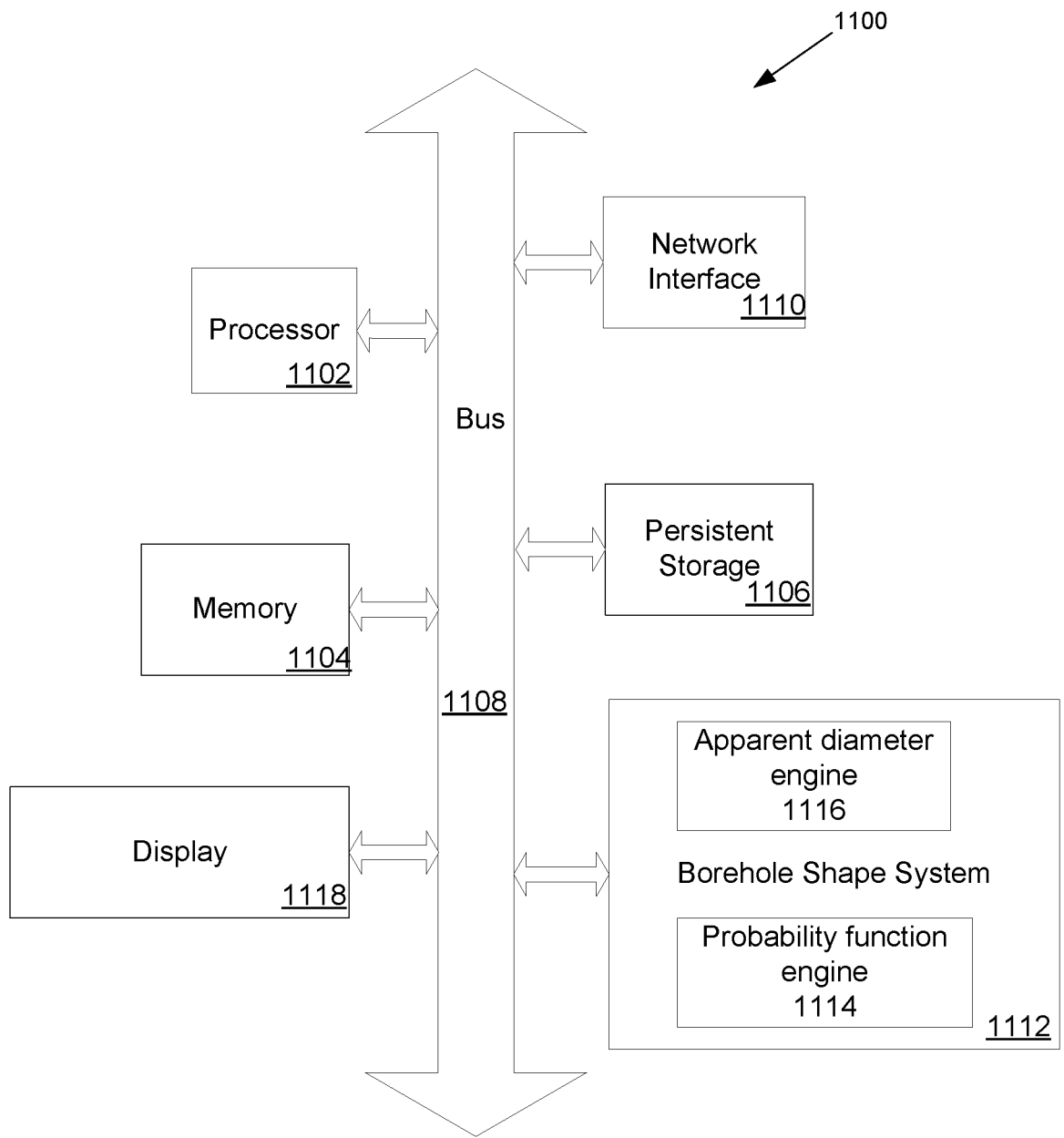
FIG. 11 is a block diagram of apparatus for determining a shape of a borehole drilled in a formation.

FIG. 11 is a block diagram of apparatus 1100 (e.g., computer system 932) for determining a shape of a borehole drilled in a formation. The apparatus 1100 may be located on the surface and/or downhole as part of the downhole tool or other system.

The apparatus 1100 includes a processor 1102 (possibly including multiple processors, multiple cores, multiple nodes, and/or implementing multi-threading, etc.). The apparatus 1100 includes memory 1104. The memory 1104 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media for storing computer instructions, program code, and/or software executable by the processor 1102.

The apparatus 1100 may also include a persistent data storage 1106. The persistent data storage 1106 can be a hard disk drive, such as magnetic storage device. The computer device also includes a bus 1108 (e.g., PCI, ISA, PCI-Express, etc.) and a network interface 1110 in communication with the downhole tool. The apparatus 1100 may have a borehole shape system 1112 to determine a shape of a borehole based on measurement of apparent diameters using the downhole tool and probability functions as described above. The borehole shape system 1112 includes an apparent diameter engine 1116 for determining apparent diameter of a borehole and probability function engine 1114 for determining various probability functions associated with determining a borehole shape.

Further, the apparatus 1100 may further comprise a display 1118. The display 1118 may comprise a computer screen or other visual device. The display 1118 may show feedback including a graphical illustration of a shape of the borehole in the formation with semimajor and semiminor axis.

The apparatus 1100 may implement any one of the previously described functionalities partially (or entirely) in hardware and/or software (e.g., computer code, program instructions, program code) stored on a machine readable medium/media. In some instances, the software is executed by the processor 1102. Further, realizations can include fewer or additional components not illustrated in FIG. 11 (e.g., video cards, audio cards, additional network interfaces, peripheral devices, etc.). The processor 1102 and the memory 1104 are coupled to the bus 1108. Although illustrated as being coupled to the bus 1108, the memory 1104 can be coupled to the processor 1102.

Advantageously, determination of the shape of the borehole ellipse as describe herein does not require any multivariable optimization process. Further, reasonable firing rates of calipers are needed along with a minimal number of calipers (e.g., 2) to determine the borehole shape. The downhole tool may also freely rotate and move while in operation as the apparent diameters are determined. The determination of the apparent diameters is also not based on any direction (e.g., vertical, horizontal, or diagonal) of the borehole.

Further, the shape of the borehole can be used to facilitate drilling for hydrocarbons. For example, selection of mud weight for lubrication of the drill bit and drilling direction may be adjusted and/or maintained based on the shape of the borehole. As another example, computation of a volume of the borehole for purposes of cementing the borehole may be based on the shape of the borehole. Other variations are also possible.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 402-410 and 702-708 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any non-transitory tangible medium (e.g., non-transitory machine readable media) that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device. Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for formation properties ahead of a drill bit as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

EXAMPLE EMBODIMENTS

Example embodiments include the following:

Embodiment 1

A method comprising: placing a downhole tool in a borehole of a subsurface formation, wherein the downhole tool comprises a plurality of calipers arranged around a circumference of the downhole tool; receiving a plurality of standoff measurements for different rotation angles of the downhole tool, wherein each standoff measurement is indicative of a distance between one of the plurality of calipers and a wall of the borehole; determining a plurality of apparent diameters of the borehole for the different rotation angles of the downhole tool based on the plurality of standoff measurements and a radius of the downhole tool; determining a probability function based on the plurality of apparent diameters; and identifying at least one of a semiminor axis, semimajor axis, and ellipticity of the borehole based on the probability function.

Embodiment 2

The method of Embodiment 1, wherein the probability function is a probability density function.

Embodiment 3

The method of Embodiment 1-2, wherein identifying at least one of a semiminor axis, semimajor axis, and ellipticity of the borehole comprises determining a given apparent diameter associated with a maximum probability of the probability density function and a maximum apparent diameter indicated by the probability density function, wherein the given apparent diameter is the semiminor axis of the borehole and the maximum apparent diameter is the semimajor axis of the borehole.

Embodiment 4

The method of any of Embodiments 1-3, wherein the probability function is a cumulative distribution function.

Embodiment 5

The method of any of Embodiments 1-4, wherein the cumulative distribution function is an experimental cumulative distribution function; and wherein identifying at least one of a semiminor axis, semimajor axis, and ellipticity of the borehole based on the probability function comprises fitting a modeled cumulative distribution function to the experimental cumulative distribution function, wherein parameters of the fitted modeled cumulative distribution function are indicative of the at least one of the semiminor axis, semimajor axis, and ellipticity of the borehole.

Embodiment 6

The method of any of Embodiments 1-5, wherein the fitting is based on a non-linear least squares inversion.

Embodiment 7

The method of any of Embodiments 1-6, wherein a number of the plurality of standoff measurements is based on a following relationship:

$$n_{min} \le \frac{D \cdot R_f \cdot rpm \cdot N}{2 \cdot V_{DS}}$$

where $n_{min}$ is a minimal required total number of measurements, D is a spatial resolution over which the standoff measurements are performed, $R_f$ is a firing rate of the calipers, rpm is revolutions per minute that the downhole tool is spinning, N is a number of calipers on the downhole tool, and $V_{ds}$ is a drilling speed.

Embodiment 8

The method of any of Embodiments 1-7, further comprising drilling based on the at least one of the semiminor axis, semimajor axis, and ellipticity shape of the borehole.

Embodiment 9

One or more non-transitory machine-readable media comprising program code executable by a processor, the program code to: receive, from a plurality of ultrasonic calipers of a downhole tool, a plurality of standoff measurements for different rotation angles of the downhole tool, the downhole tool deployed in a borehole of a subsurface formation, wherein the plurality of calipers are arranged around a circumference of the downhole tool, wherein at least two of the plurality of calipers are diagonal from each other, and wherein each standoff measurement is indicative of a distance between one of the plurality of calipers and a wall of the borehole; determine a plurality of apparent diameters of the borehole for the different rotation angles of the downhole tool based on the plurality of standoff measurements and a radius of the downhole tool; determine a probability function based on the plurality of apparent diameters; and identify at least one of a semiminor axis, semimajor axis, and ellipticity of the borehole based on the probability function.

Embodiment 10

The one or more non-transitory machine-readable media of Embodiment 9, wherein the probability function is a probability density function.

Embodiment 11

The one or more non-transitory machine-readable media of Embodiment 9-10, wherein the program code to identify at least one of a semiminor axis, semimajor axis, and ellipticity of the borehole comprises program code to determine a given apparent diameter associated with a maximum probability of the probability density function and a maximum apparent diameter indicated by the probability density function, wherein the given apparent diameter is the semiminor axis of the borehole and the maximum apparent diameter is the semimajor axis of the borehole.

Embodiment 12

The one or more non-transitory machine-readable media of any of Embodiments 9-11, wherein the probability function is a cumulative distribution function.

Embodiment 13

The one or more non-transitory machine-readable media of any of Embodiments 9-12, wherein the cumulative distribution function is an experimental cumulative distribution function; and wherein the program code to identify at least one of a semiminor axis, semimajor axis, and ellipticity of the borehole based on the probability function comprises program code to fit a modeled cumulative distribution function to the experimental cumulative distribution function, wherein parameters of the fitted modeled cumulative distribution function are indicative of the at least one of the semiminor axis, semimajor axis, and ellipticity of the borehole.

Embodiment 14

The one or more non-transitory machine-readable media of any of Embodiments 9-13, wherein the fitting is based on a non-linear least squares inversion.

Embodiment 15

The one or more non-transitory machine-readable media of any of Embodiments 9-14, wherein the borehole is shaped as an ellipse.

Embodiment 16

A system comprising: a downhole tool deployed a borehole of a subsurface formation, wherein the downhole tool comprises a plurality of calipers arranged around a circumference of the downhole tool and wherein at least two of the plurality of calipers are located diagonally across from each other; a processor; a non-transitory machine readable media having program code executable by the processor to cause the processor to receive a plurality of standoff measurements for different rotation angles of the downhole tool, wherein each standoff measurement is indicative of a distance between one of the plurality of calipers and a wall of the borehole; determine a plurality of apparent diameters of the borehole for the different rotation angles of the downhole tool based on the plurality of standoff measurements and a radius of the downhole tool; determine a probability function based on the plurality of apparent diameters; and identify at least one of a semiminor axis, semimajor axis, and ellipticity of the borehole based on the probability function.

Embodiment 17

The system of Embodiment 16, wherein the probability function is a probability density function.

Embodiment 18

The system of Embodiment 16 or 17, wherein the program code executable by the processor to cause the processor to identify at least one of a semiminor axis, semimajor axis, and ellipticity of the borehole comprises program code to determine a given apparent diameter associated with a maximum probability of the probability density function and a maximum apparent diameter indicated by the probability density function, wherein the given apparent diameter is the semiminor axis of the borehole and the maximum apparent diameter is the semimajor axis of the borehole.

Embodiment 19

The system of any of Embodiments 16-18, wherein the probability function is a cumulative distribution function.

Embodiment 20

The system of any of Embodiments 16-19, wherein the cumulative distribution function is an experimental cumulative distribution function; and wherein the program code executable by the processor to cause the processor to identify at least one of a semiminor axis, semimajor axis, and ellipticity of the borehole based on the probability function comprises program code to fit a modeled cumulative distribution function to the experimental cumulative distribution function, wherein parameters of the modeled cumulative distribution function which fit the experimental cumulative distribution function are indicative of the at least one of the semiminor axis, semimajor axis, and ellipticity of the borehole.

What is claimed is:

1. A method comprising:
placing a downhole tool in a borehole of a subsurface formation, wherein the downhole tool comprises a plurality of calipers arranged around a circumference of the downhole tool;
receiving a plurality of standoff measurements for different rotation angles of the downhole tool, wherein each standoff measurement is indicative of a distance between one of the plurality of calipers and a wall of the borehole;
determining a plurality of apparent diameters of the borehole for the different rotation angles of the downhole tool based on the plurality of standoff measurements and a radius of the downhole tool;
determining a probability function based on the plurality of apparent diameters; and
identifying at least one of a semiminor axis, semimajor axis, and ellipticity of the borehole based on the probability function.

2. The method of claim 1, wherein the probability function is a probability density function.

3. The method of claim 2, wherein identifying at least one of a semiminor axis, semimajor axis, and ellipticity of the borehole comprises determining a given apparent diameter associated with a maximum probability of the probability density function and a maximum apparent diameter indicated by the probability density function, wherein the given apparent diameter is the semiminor axis of the borehole and the maximum apparent diameter is the semimajor axis of the borehole.

4. The method of claim 1, wherein the probability function is a cumulative distribution function.

5. The method of claim 4, wherein the cumulative distribution function is an experimental cumulative distribution function; and wherein identifying at least one of a semiminor axis, semimajor axis, and ellipticity of the borehole based on the probability function comprises fitting a modeled cumulative distribution function to the experimental cumulative distribution function, wherein parameters of the fitted modeled cumulative distribution function are indicative of the at least one of the semiminor axis, semimajor axis, and ellipticity of the borehole.

6. The method of claim 5, wherein the fitting is based on a non-linear least squares inversion.

7. The method of claim 1, wherein a number of the plurality of standoff measurements is based on a following relationship:

$$n_{min} \leq \frac{D \cdot R_f \cdot rpm \cdot N}{2 \cdot V_{DS}}$$

where $n_{min}$ is a minimal required total number of measurements, D is a spatial resolution over which the standoff measurements are performed, $R_f$ is a firing rate of the calipers, rpm is revolutions per minute that the downhole tool is spinning, N is a number of calipers on the downhole tool, and $V_{ds}$ is a drilling speed.

8. The method of claim 1, further comprising drilling based on the at least one of the semiminor axis, semimajor axis, and ellipticity shape of the borehole.

9. One or more non-transitory machine-readable media comprising program code executable by a processor, the program code to:
receive, from a plurality of ultrasonic calipers of a downhole tool, a plurality of standoff measurements for different rotation angles of the downhole tool, the downhole tool deployed in a borehole of a subsurface formation, wherein the plurality of calipers are arranged around a circumference of the downhole tool, wherein at least two of the plurality of calipers are diagonal from each other, and wherein each standoff measurement is indicative of a distance between one of the plurality of calipers and a wall of the borehole;
determine a plurality of apparent diameters of the borehole for the different rotation angles of the downhole tool based on the plurality of standoff measurements and a radius of the downhole tool;

determine a probability function based on the plurality of apparent diameters; and identify at least one of a semiminor axis, semimajor axis, and ellipticity of the borehole based on the probability function.

10. The one or more non-transitory machine-readable media of claim 9, wherein the probability function is a probability density function.

11. The one or more non-transitory machine-readable media of claim 10, wherein the program code to identify at least one of a semiminor axis, semimajor axis, and ellipticity of the borehole comprises program code to determine a given apparent diameter associated with a maximum probability of the probability density function and a maximum apparent diameter indicated by the probability density function, wherein the given apparent diameter is the semiminor axis of the borehole and the maximum apparent diameter is the semimajor axis of the borehole.

12. The one or more non-transitory machine-readable media of claim 9, wherein the probability function is a cumulative distribution function.

13. The one or more non-transitory machine-readable media of claim 12, wherein the cumulative distribution function is an experimental cumulative distribution function; and wherein the program code to identify at least one of a semiminor axis, semimajor axis, and ellipticity of the borehole based on the probability function comprises program code to fit a modeled cumulative distribution function to the experimental cumulative distribution function, wherein parameters of the fitted modeled cumulative distribution function are indicative of the at least one of the semiminor axis, semimajor axis, and ellipticity of the borehole.

14. The one or more non-transitory machine-readable media of claim 13, wherein the fitting is based on a non-linear least squares inversion.

15. The one or more non-transitory machine-readable media of claim 9, wherein the borehole is shaped as an ellipse.

16. A system comprising:

a downhole tool deployed a borehole of a subsurface formation, wherein the downhole tool comprises a plurality of calipers arranged around a circumference of the downhole tool and wherein at least two of the plurality of calipers are located diagonally across from each other;

a processor;

a non-transitory machine readable media having program code executable by the processor to cause the processor to:

receive a plurality of standoff measurements for different rotation angles of the downhole tool, wherein each standoff measurement is indicative of a distance between one of the plurality of calipers and a wall of the borehole;

determine a plurality of apparent diameters of the borehole for the different rotation angles of the downhole tool based on the plurality of standoff measurements and a radius of the downhole tool;

determine a probability function based on the plurality of apparent diameters; and identify at least one of a semiminor axis, semimajor axis, and ellipticity of the borehole based on the probability function.

17. The system of claim 16, wherein the probability function is a probability density function.

18. The system of claim 17, wherein the program code executable by the processor to cause the processor to identify at least one of a semiminor axis, semimajor axis, and ellipticity of the borehole comprises program code to determine a given apparent diameter associated with a maximum probability of the probability density function and a maximum apparent diameter indicated by the probability density function, wherein the given apparent diameter is the semiminor axis of the borehole and the maximum apparent diameter is the semimajor axis of the borehole.

19. The system of claim 16, wherein the probability function is a cumulative distribution function.

20. The system of claim 19, wherein the cumulative distribution function is an experimental cumulative distribution function; and wherein the program code executable by the processor to cause the processor to identify at least one of a semiminor axis, semimajor axis, and ellipticity of the borehole based on the probability function comprises program code to fit a modeled cumulative distribution function to the experimental cumulative distribution function, wherein parameters of the modeled cumulative distribution function which fit the experimental cumulative distribution function are indicative of the at least one of the semiminor axis, semimajor axis, and ellipticity of the borehole.

* * * * *